Patented Sept. 19, 1933

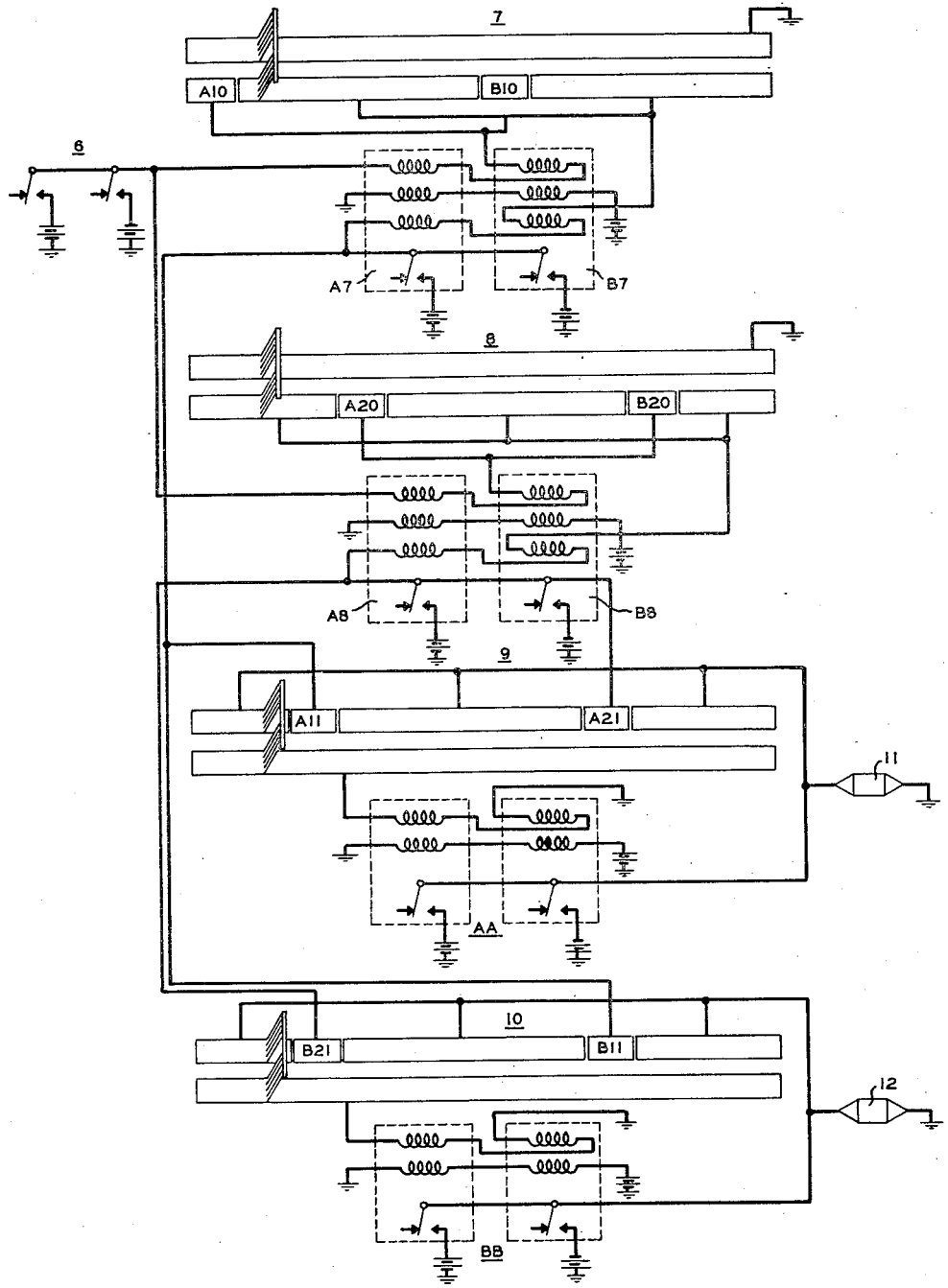

1,927,699

UNITED STATES PATENT OFFICE 1,927,699

TELEGRAPH SYSTEM

Allison A. Clokey, Rutherford, N. J., and Marion H. Woodward, Springfield, N. Y., assignors to International Communications Laboratories, Inc., Newark, N. J., a corporation of New York Application August 31, 1932. Serial No. 631,182

7 Claims. (Cl. 178—52)

This invention relates to telegraph systems utilizing synchronized or step-by-step transmitters and receivers, and particularly to regenerating means for the reception and retransmission of the signals.

This invention comprises an arrangement of relays and a distributor at the receiving or sending end of a line for reproducing transmitted signals. The invention is more particularly intended for cable or line telegraphy but may be adapted to wireless or other electrical systems where synchronism is maintained between the transmitters and receivers.

In particular, the apparatus and method herein described is adapted to operate a cable code multiplex system. An object of this invention is to provide a novel and efficient method of channelling which consists in transmitting two pulses at a time from each channel into the line.

Another object of this invention is to provide means for efficiently and accurately breaking up these combined signals at the receiving station in a manner the reverse of that in which they were combined at the transmitting station.

Further objects will be found in the following description, when considered together with the accompanying drawings.

The method and apparatus with which the invention is concerned will be best understood by reference to the accompanying drawings, in which Fig. 1 represents a transmitting station having continuously running transmitters of the phonic wheel type. Two transmitters are shown which, together with the relays and rings, combine signals from these two transmitters and transmit the combined signals, in the form shown in Fig. 5, over a cable.

Fig. 3 represents a multiplex receiving station and the rings and relays used in one embodiment for breaking up the combined signals into their individual channels and reproducing the same.

Figure 1:
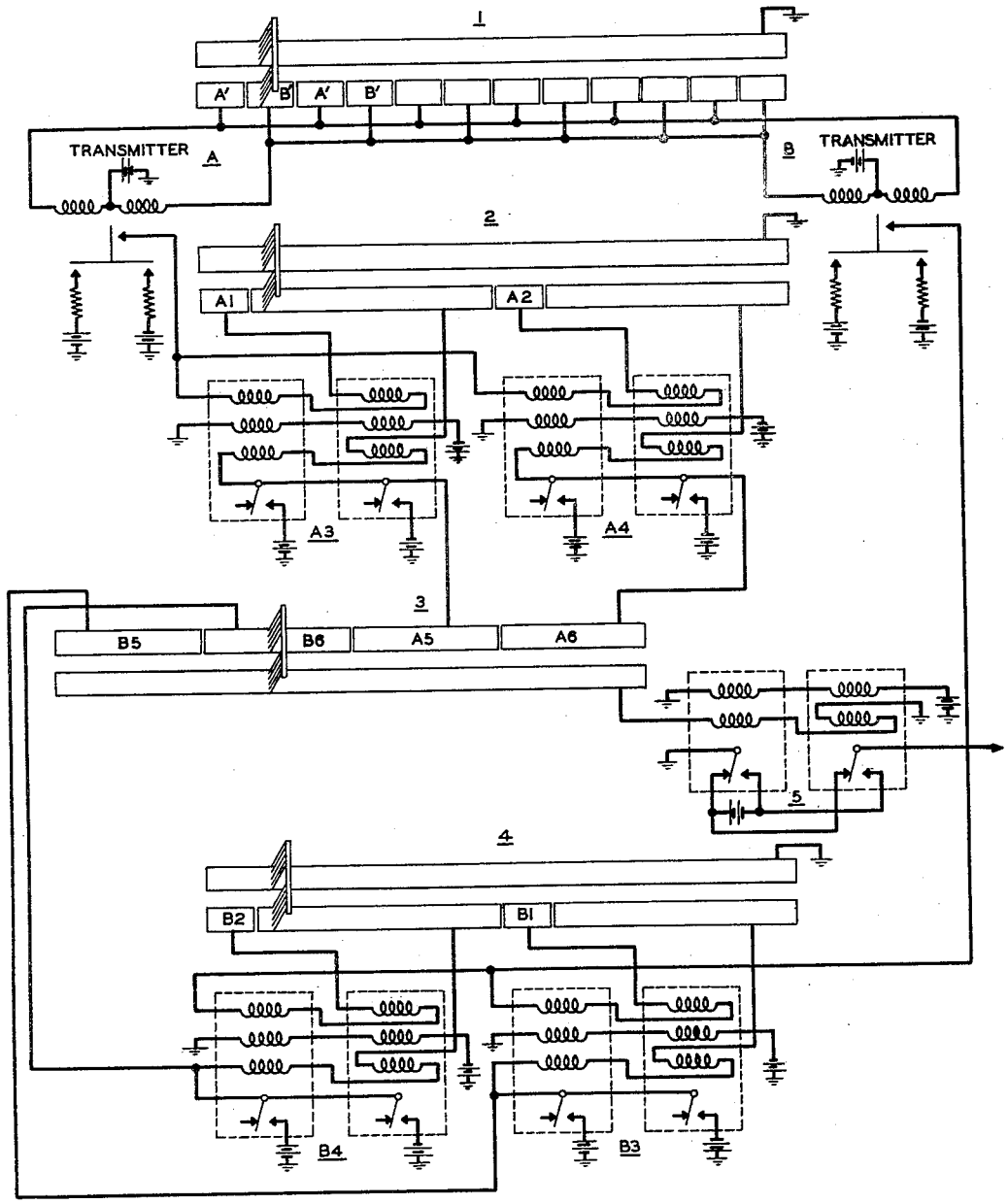

Referring, now, to Fig. 1, a more detailed description will be given of one embodiment of the invention. Two transmitters and transmitting channels are shown, namely A and B. The particular channels have numerical indications positioned after the letters A and B. The distributor includes four pairs of rings, transmitter operating rings 1, A channel rings 2, B channel rings 4, and transmitting rings 3. Each of these pairs of rings is made up of one segmented and one unsegmented ring. Fig. 1 shows each transmitter as of the well known continuously running automatic transmitter type, driven by the usual phonic wheel which is energized by the coils shown connected to rings 1 through an obvious circuit. The usual cable code tape is used in each of the transmitters. Thus, using the cable code and assuming a dash to be transmitted over the B channel and, further, that the brushes of the apparatus are in the phases shown in Fig. 1, the following circuits will be completed:

Right contact and curbing contact of transmitter B will close. As the brush associated therewith passes over pair of rings 4, an obvious circuit is completed first through segment B2 to cause the right armature of relays B4 to go to mark. On further turning, the same brush causes a locking circuit to be completed through the lower windings of relays B4, whereby the signal element is stored on the right relay of relays B4. Then, when the brushes associated with pair of rings 3 reach segment B6, an obvious circuit is completed for the energization of the sending-on relays 5, the right tongue of which goes to marking position, putting negative potential to the cable. In current cable usage, a negative potential indicates a dash.

Figure 5:
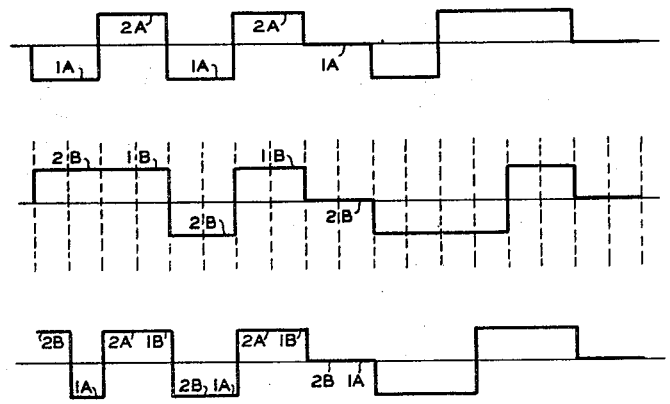
Fig. 5 shows the signals as produced by each transmitter and also the manner of combining these signals for transmission over a line.

It is to be noted that only the first half of the signal element from transmitter B is used in the above method of transmission. The next signal transmitted comes from the A5 segment, which is immediately followed by one from the A6 segment. In the case of the signals from the A transmitter, it is clear from the diagram that the latter half of the first of the pair of signals and the first half of the second of the pair of A channel signals are the only parts used. In this way each transmitter alternately sends out two signal elements in consecutive order. Reference to Fig. 5 will make this method of transmission clear without further explanation.

Assume, for example, that the letter F is to be transmitted over the B channel and the letter C over the A channel.

F is represented by dot, dot, dash, dot.

C is represented by dash, dot, dash, dot.

Let the apparatus be in the condition shown in Fig. 1. Then, a dot is to be transmitted over the cable from transmitter B through segment B6 through the following circuits. Left contact of transmitter B, through upper windings of relays B4, segment B2, brush and rings 4, to negative battery at transmitter B. This causes left relay of pair of relays B4 to go to marking position, placing positive battery on segment B6 of rings 3. The segment immediately following B2 on rings 4 serves to complete a locking circuit for relays B4, whereby they are held in the position in which they were caused to move by their previous energization through segment B2. The brush associated with rings 3 completes a circuit for the energization of sending-on relays 5, the left tongue of which goes to marking, whereby the ground is removed from the cable and positive potential applied to the cable. The next signal element is sent out over segment A5. While the brushes associated with rings 3 were on segment B6, the brushes of rings 2 were receiving and locking up the first signal element of the letter C, namely a dash. This may be traced through an obvious circuit from the right contact of transmitter A to cause the right member of relays A3 to go to marking position. One quarter of a revolution later, segment A5 will transmit the dash element locked up in the right member of relays A3 through a circuit completed by the brush associated with rings 3 and then over sending-on relay 5 to the cable. The tapes in transmitters A and B are continually being stepped forward, the second element in the letter F, namely a dot, is being set up and stored in relays B3 during the third quarter of a revolution, while, simultaneously, segment A6 is causing the second element of the letter C, namely a dot, to be transmitted over the cable.

The circuits for the completion of the transmission of the letters F and C and the method of operation will be obvious to those versed in the art, from the detailed description given above.

The space element after the F and C signal elements are transmitted is set up by sending-on relays 5 having their operating windings left unenergized. Reference to Fig. 5, wherein a portion of the first line of signals represents the letter C, a portion of the second line of signals represents the letter F, and a portion of the third line of signals represents the combined signals, will make the above description very clear. Thus, it is seen that the transmitting rings 3 recombine the signals from the four groups of relays A3, A4, B3, B4 in the proper sequence for operating the sending-on relays 5.

Figure 2:
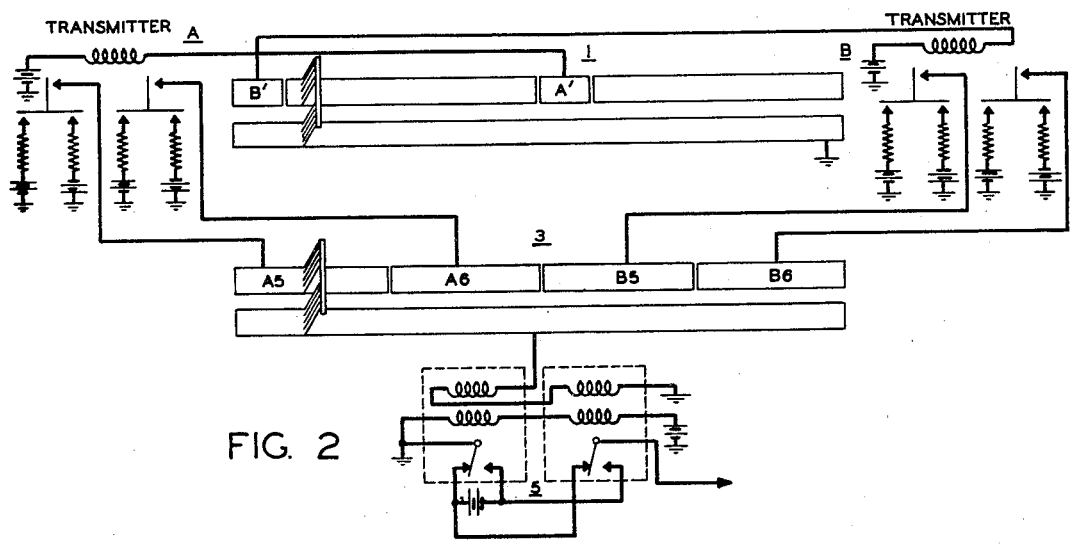
Fig. 2 represents a pair of transmitters, each having double sets of pecker rods and step-by-step magnets for advancing the tapes two center holes at a time. Here no holding or locking windings are necessary, as the pecker pins remain in position until the signal combination is transmitted.

Fig. 2 is a modification of Fig. 1, differing principally in that step-by-step transmitters are used, instead of a phonic wheel, for advancing the tapes. The transmitters are shown as each having a double set of pecker rods and contacts. Here no storage relays are necessary, as the signal elements are stored on the tape which is, for example, held in position on the A transmitter while the brush on rings 3 passes over the A segments of rings 3. The operation of this embodiment will be apparent after the detailed explanation above, given in connection with Fig. 1. Each time each transmitter is operated, the tape is stepped forward two center holes so that two impulses may be selected by the two sets of pecker rods in each transmitter. The tongues of the transmitters are connected to the segments of the transmitting rings for operating the sending-on relays in the proper sequence. In Fig. 2, numerals corresponding to those of Fig. 1 indicate corresponding parts.

Fig. 3 shows a receiving station. The usual cable relay (not shown), well known to those versed in the art, is used here, together with the receiving relays 6. The first pulses of the A and B channels are received and locked up on the A7, B7 relays through the synchronously driven rings 7. Relays A7 and B7 function in a manner corresponding to that of relays A3, A4, B3, B4 of Fig. 1. Thus, if a negative element is received over the cable for the A channel, right tongue of relays 6 closes simultaneously with the passage over segment A10 of the brush associated with rings 7. This causes relay B7 to go to marking position. Then, upon further advance of the brush associated with rings 7, to the next segment, a locking and storage circuit is completed through the lower windings of relays A7 and B7 for holding the negative impulse stored on the tongue of relay B7. Then, as the brushes associated with rings 9 advance to segment A11, an obvious circuit is completed to cause relays AA to energize and the tongue of the right one to mark. This, in turn, causes a record to be made on the A channel recording mechanism 11.

The next impulse coming over the cable will cause relays A8 and B8 to be energized. Thus, if it be a plus impulse and on the A channel, it will be received on the left member of receiving relays 6, and when the brush associated with rings 8 passes over segment A20, relay A8 will be energized and go to marking position. Upon further advance of the distributor brushes, this signal element is locked and stored in relay A8 until segment A21 is reached, when it is passed on to the A channel relays AA and subsequently recorded at the A channel recording mechanism 11. While this is being accomplished, relay B7 is released just before segment B10 is reached and relays A7, B7 are prepared for the reception of the first element of the B channel signal. It follows directly from the above description that the first B channel element is stored in relays A7, B7 and transferred to the B channel relays BB and the B channel recording mechanism 12 through a circuit including segment B11. Then, the second element of the B channel is set up and stored in relays A8 and B8 and, correspondingly, transferred to relays BB and recording mechanism 12 of the B channel through a circuit including segment B21.

It is believed unnecessary to trace the course of the circuits for the reception of the letters F and C over the B and A channel receiving apparatus, respectively, as anyone skilled in the art and having read the above description can readily trace these circuits. Reference to Fig. 5, starting with the lowest line and proceeding upward, will, no doubt, assist one in visualizing what happens in the unravelling of the two channel signals. Thus, relay group A7 and B7 and relay group A8 and B8 send the signals on to the A channel and B channel rings 9 and 10, respectively, for operating the relays AA and BB and for operating the recording apparatus 11 and 12. The channel records which are operated from the relays AA and BB will then give a one hundred percent signal record.

Figure 4:
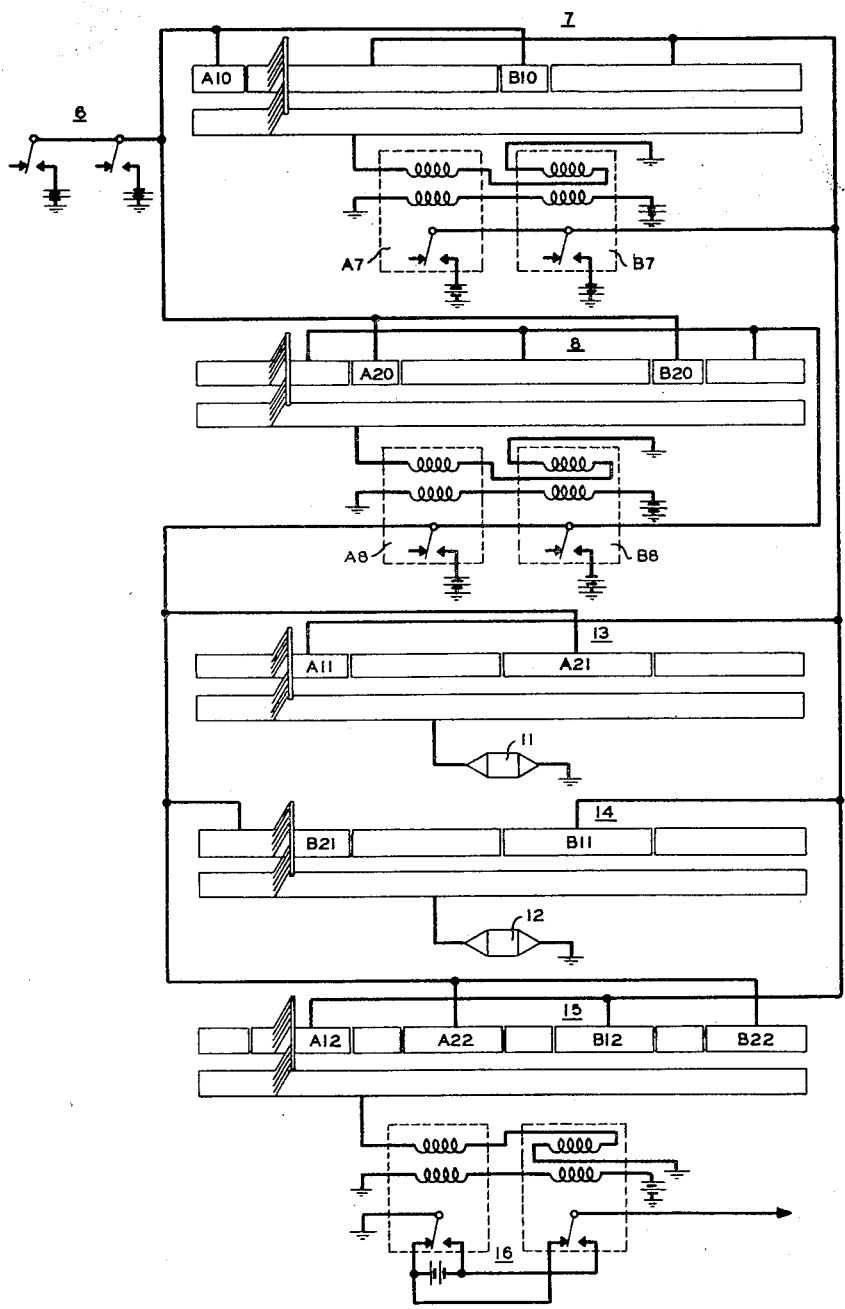
Fig. 4 shows a regenerative repeater station suitable for long line retransmission, as well as for the reproduction at the repeater station of the received signals.

Fig. 4 shows a regenerating repeater station wherein the same results are produced as in Fig. 3. Here the operating windings of relays A7, B7, A8, B8 are first used to set up the received signal elements, just as in Fig. 3; then the same windings are utilized for holding and storing the signal set up. The operation of this modification is obvious to anyone skilled in the art, especially after the detailed discussion given above in connection with Fig. 3. For this reason, a complete description of the apparatus of Fig. 4 is believed unnecessary. It may be noted, in passing, that the first impulses of each channel are locked up on the A7, B7 relays and the second impulses of each channel are locked up on the A8, B8 relays in a manner closely similar to that described in connection with Fig. 3. However, due to the length of the segments, only fifty percent records are received on the A recording device 11, and the B recording device, i. e. the impulse elements, are one-half the normal length.

The signal elements are then conveyed to retransmitting rings 15 whereon they are set up on corresponding segments and passed on by means of the associated brush to sending-on relays 16, which are operated from the two groups of relays, namely A7, B7 and A8, B8, in the proper sequence. Relays 16 serve to repeat the received signal elements to the outgoing cable or telegraph line.

What is claimed is:

1. In a telegraph system, means for receiving or retransmitting signals, comprising a rotary distributor operating synchronously with the received signal impulses, two pairs of normally biased polar relays operatively associated therewith, the first pair of said relays acting to receive and store alternate odd signal impulses, the second pair acting to receive and store alternate even signal impulses, said distributor operating to cause the actuation of said relays and to retransmit the signals stored therein.

2. In a telegraph system, means for receiving or retransmitting signals, comprising a rotary distributor operating synchronously with the received signal impulses, two pairs of normally biased polar relays operatively associated therewith, the first pair of said relays acting to receive and store alternate odd signal impulses, the second pair acting to receive and store alternate even signal impulses, said distributor being provided with means for holding actuated a previously actuated relay and for actuating a retransmitting relay while maintaining said actuated storing relay energized.

3. In a telegraph system, means for receiving or retransmitting signals, comprising a rotary distributor operating synchronously with the received signal impulses, two pairs of normally biased polar relays operatively associated therewith, the first pair of said relays acting to receive and store alternate odd signal impulses, the second pair acting to receive and store alternate even signal impulses, said storage relays being effective upon operation to maintain themselves in locked condition.

4. In a telegraph system, means for receiving or retransmitting signals, comprising a rotary distributor operating synchronously with the received signal impulses, two pairs of normally biased polar relays operatively associated therewith, the first pair of said relays acting to receive and store alternate odd signal impulses, the second pair acting to receive and store alternate even signal impulses, said storing relays cooperating with said distributor for maintaining themselves in locked condition.

5. In a transmitting station, the combination of means for combining and transmitting a pair of messages over a single channel, said means comprising storage relays and distributors for alternately transmitting in succession two signal elements from one of said messages followed by two signal elements from the other of said messages.

6. In a receiving station, the combination of means for receiving a pair of messages two signal elements of each message at a time in alternate succession, means for separating said messages, and means for recording the same as individual messages.

7. A receiving station in accordance with claim 6, characterized in this, that additional means is provided for retransmitting one of the received messages.

ALLISON A. CLOKEY.
MARION H. WOODWARD.